United States Patent [19]

Takemura et al.

[11] Patent Number: 4,932,510
[45] Date of Patent: * Jun. 12, 1990

[54] VEHICLE SPEED RESPONSIVE VARIABLE TORQUE TRANSMITTING ASSEMBLY

[75] Inventors: Tooji Takemura, Yokohama; Takashi Ookubo, Yokosuka, both of Japan

[73] Assignee: Nissan Motor Co., Ltd., Yokohama, Japan

[*] Notice: The portion of the term of this patent subsequent to May 1, 2007 has been disclaimed.

[21] Appl. No.: 58,209

[22] Filed: Jun. 4, 1987

[30] Foreign Application Priority Data

Jun. 4, 1986 [JP] Japan ................. 61-129424

[51] Int. Cl.⁵ .............................. F16D 31/02
[52] U.S. Cl. ........................ 192/60; 475/84; 180/248
[58] Field of Search .......... 74/687, 711, 710.5, 74/718, 690, 796, 650; 180/248, 249; 192/60

[56] References Cited

U.S. PATENT DOCUMENTS

| | | | |
|---|---|---|---|
| 1,836,684 | 12/1931 | Robbins | 74/650 |
| 2,440,975 | 5/1948 | Robbins | 74/650 |
| 2,511,518 | 6/1950 | Stephens | 192/60 X |
| 2,595,479 | 5/1952 | Nelson | 192/60 |
| 2,798,580 | 7/1957 | Lenz | 192/60 |
| 3,198,035 | 8/1965 | Mueller | 74/711 X |
| 3,368,425 | 2/1968 | Lewis | 74/687 X |
| 3,577,803 | 5/1971 | Mueller | 74/665 |
| 3,766,804 | 10/1973 | Mori | 74/687 |
| 3,852,998 | 12/1974 | Leeson | 74/687 X |
| 3,854,348 | 12/1974 | Stevenson | 74/718 X |
| 4,518,069 | 5/1985 | Elias | 192/60 |

FOREIGN PATENT DOCUMENTS 54-4134 3/1979 Japan.
60-116529 6/1985 Japan.

Primary Examiner—Dirk Wright
Attorney, Agent, or Firm—Foley & Lardner, Schwartz, Jeffery, Schwaab, Mack, Blumenthal & Evans

[57] ABSTRACT

A torque transmitting assembly comprises a first rotary element including internal cam surfaces, a second rotary element disposed in the first rotary element, the second rotary element including a rotor containing a plurality of radially outwardly opening pressure chambers facing the cam surfaces, and a hydraulic mechanism for transmitting a ratio of the input torque from one of the first rotary element and the second rotary element to the other in response to rotation speed of the second rotary element and also to differential rotation occurring between the first rotary element and the second rotary element. The hydraulic mechanism is rotatable with the second rotary element and includes pistons in the pressure chambers in engagement with the cam surfaces and reciprocable in response to the differential rotation, passages in fluid communication with the pressure chambers through which hydraulic fluid discharged from each of the pressure chambers on the discharge stroke of the associated one of the pistons, and a flow restrictor for restricting flow of the hydraulic fluid discharged from the pressure chambers.

15 Claims, 13 Drawing Sheets

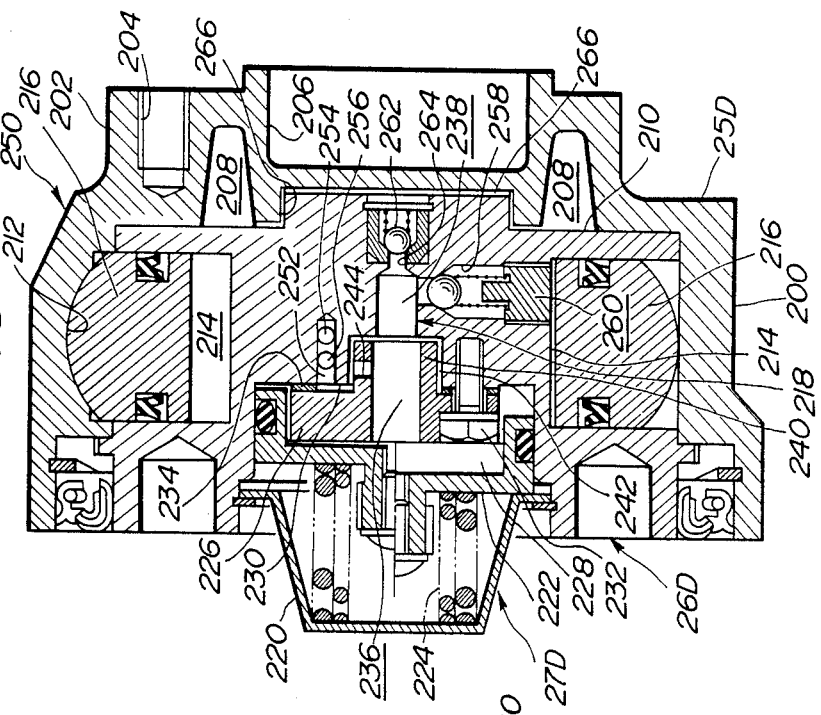
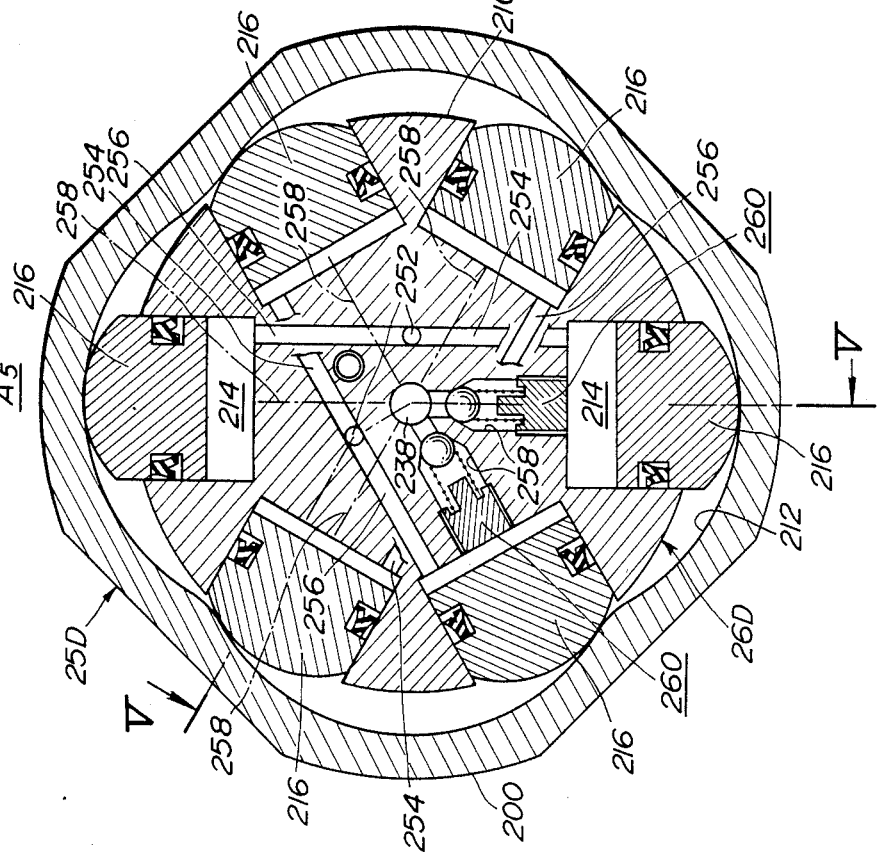

VEHICLE SPEED RESPONSIVE VARIABLE TORQUE TRANSMITTING ASSEMBLY

BACKGROUND OF THE INVENTION

The present invention relates to a torque transmitting assembly adapted primarily for use as a torque transfer/spilt unit for use with four wheel drive and more than four wheel drive vehicles, as a differential unit, or as a limited slip differential unit.

JP 60-116529 discloses a torque transmitting assembly which comprises a rotary input member including a rotor, a rotary output member including a cam ring surrounding the rotor. The rotor and the cam ring cooperate with each other to form a conventional vane pump. The vane pump is associated with a hydraulic circuit. When differential rotation occurs between the rotor and the cam ring, the vane pump produces hydraulic pressure having a magnitude variable with the differential rotation, causing a ratio of input torque from the rotor to be transmitted to the cam ring. This ratio is variable with the magnitude of the hydraulic pressure produced by the vane pump and the effective pressure acting areas of the vanes. This known torque transmitting assembly has difficulty in obtaining a stable torque transmitting performance because the components, such as a relief valve and passageways, of the hydraulic circuit, are mounted in unitary rotation with the cam ring. Thus the hydraulic fluid in the passageways and the relief valve are subject to centrifugal force occurring when the cam ring rotates at high rotational speeds. That is, the hydraulic pressure produced by the vane pump is affected by the centrifugal force, thus causing a difficulty in designing the hydraulic circuit so as to minimize the centrifugal effect. Since the hydraulic circuit is rotatable with the rotary output member integral with the cam ring, the components of the hydraulic circuit need to be arranged so that imbalance of mass of the cam ring will be minimized. However, this is very difficult, so that the cam ring tends to vibrate when it rotates at high speeds. If the vane pump is used as a hydraulic pump of a torque transmitting assembly as is the case in the known torque transmitting assembly, it is difficult to transmit input torque to the cam ring until the differential rotation increases above a relatively high level because the sealing performance of the vane pump is so poor that a hydraulic pressure high enough for torque transmitting operation will not be produced when the differential rotation is small.

U.S. Pat. No. 3,577,803 (corresponding to JP 54-4134) issued to Mueller on May 4, 1971 discloses a torque transmitting assembly for use as a torque transfer/split unit for a four or six wheel drive motor vehicle. The torque transmitting assembly comprises a first rotary element. A second rotary element is coaxially disposed within the first rotary element. A rotary input member is journalled in a stationary housing and extends into the housing connected for rotation with the first rotary element. A second rotary output member is connected for rotation with said rotary input member. Hydraulic means normally couples the first and second rotary elements together and is operable under predetermined hydraulic pressure conditions to transmit a selected ratio of the input torque from the rotary input member to said first rotary output member with the remainder of the torque being transmitted from the input member to said second rotary input member. Selector means sets the predetermined hydraulic pressure conditions under which the hydraulic means will operate so as to set the ratio of torque transmitted to said output members. The first rotary element is formed with a plurality of radially inwardly opening pressure chambers facing the second rotary element. The second rotary element includes radially directed rise and fall cam surfaces. The hydraulic means includes pistons in said pressure chambers in engagement with the cam surfaces and reciprocable in response to differential rotation of the first and second rotary elements. The pistons and their associated chambers are in a plurality of sets. Passage means is in fluid communication with the chambers of each set, through which hydraulic fluid will flow from one set of chambers to another when the pistons reciprocate. A normally closed spring loaded ball check element is disposed in the passage means and prevents fluid communication between the sets of chambers when closed and, when open, regulates the rate at which fluid can flow between the sets of chambers. The selector means includes an adjustment element for selectively setting the spring-loading of the ball check element. When the ball check element is in a closed position, no fluid can be displaced from the sets of fluid pressure chambers, and therefore, no relative rotation occurs between the first rotary element and the second rotary element. However, when the ball check element is moved to an open position, hydraulic fluid displaced from the pressure chamber can be discharged through a port in which the ball check element is located. The extent of opening of this port will control the rate at which relative rotation can occur between the first and second rotary element. The hydraulic fluid that passes through the port in which the ball check element is located will be returned to the pressure chambers on the suction strokes of the pistons.

In this known torque transmitting assembly, since the ratio of torque transmitted to the output members is set by the ball check element operable by the selector means, so called tight braking phenomena will occur when a relatively small differential rotation need to occur between front wheels and rear wheels on turning on a road with a high friction coefficient if the ball check element is left in the closed position.

Since the radially directed rise and fall cam surfaces are formed on the second rotary element disposed radially inside the first rotary element, the circumferential distance between the high point of the cam surface and the adjacent low point thereof is not long enough to allow a mild and gradual cam slope to extend between the high point and the low point. This also causes a difficulty in finishing the surface of the slope. As a result, a high possibility exists that the associated pistons cannot follow the cam surfaces so that the pistons will impinge on the cam surfaces, thereby to allow production of sound due to such impinging.

Since the pistons are directed radially inwardly to rest on the radially outwardly directed cam surfaces of the second rotary element, the pistons loose their appropriate engagement with the cam surfaces due to the centrifugal force when the rotary elements rotate at high speeds. Thus, the ratio of torque transmitted to the second rotary element decreases as the vehicle speed increases.

SUMMARY OF THE INVENTION

According to the present invention, there is provided a torque transmitting assembly, which comprises:

a first rotary element including internal cam surface means;

a second rotary element disposed in said first rotary element, said second rotary element including a rotor containing a plurality of radially outwardly opening pressure chambers facing said cam surface means; and hydraulic means for transmitting a ratio of the input torque from one of said first rotary element and said second rotary element to the other in response to rotation speed of said second rotary element and also to differential rotation occurring between said first rotary element and said second rotary element, said hydraulic means including pistons in said pressure chambers in engagement with said cam surface means and reciprocable in response to said differential rotation, passage means in fluid communication with said pressure chambers through which hydraulic fluid discharged from each of said pressure chambers on the discharge stroke of the associated one of said pistons, and means for restricting flow of the hydraulic fluid discharged from said pressure chambers.

An object of this invention is to provide a torque transmitting assembly to be used with a motor vehicle whereby a ratio of input torque transmitted is variable not only with differential rotational speed but also with output rotational speed.

BRIEF DESCRIPTION OF THE DRAWINGS

FIG. 15 is a fragmentary section through a fifth embodiment of a torque transmitting assembly of the present invention;

FIG. 16 is a fragmentary section taken on the line V—V of FIG. 15; and

DESCRIPTION OF THE PREFERRED EMBODIMENTS

Figure 3:
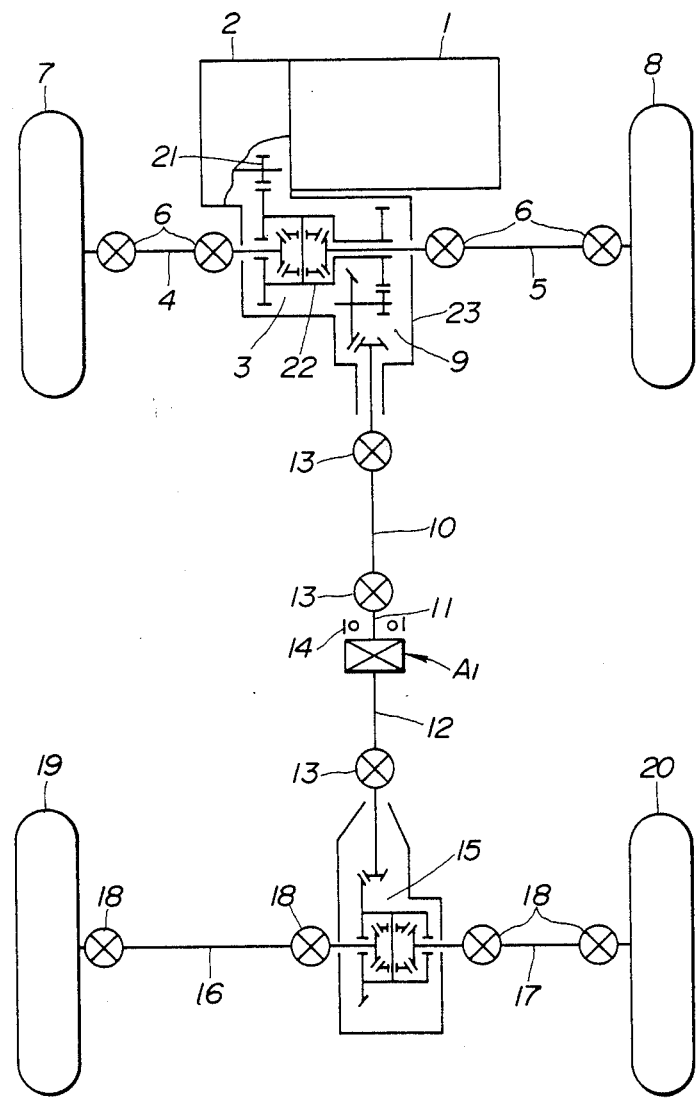
FIG. 3 is a fragmentary schematic top plan view showing a drive assembly of a four wheel drive vehicle containing the embodiment of the present invention.

Attention is now directed to FIG. 3 for a description of a vehicle in which the first embodiment of the present invention is employed. Only portions of the vehicle are shown so that the drive system can be seen more readily. The vehicle is of a four wheel drive vehicle employing a front engine front drive. The vehicle includes an engine 1, a transmission (including a clutch) 2, a front differential 3, front axles 4, 5, front drive joints 6, front wheels 7, 8, a transfer gear train 9, a front propeller shaft 10, a center propeller shaft 11, a torque transmitting assembly A1, a rear propeller shaft 12, propeller shaft joints 13, a center bearing 14, a rear differential 15, rear axles 16, 17, rear drive shaft joints 18, and rear axles 19, 20.

The front differential 3 is drivingly connected to a final stage gear 21 of the transmission 2, and to the front axles 4, 5 and serves as a differential between the front wheels 7, 8. The transfer gear train 9 is a torque transfer/split unit arranged to transfer a torque from a differential case 22 toward the rear wheels 19, 20. The front differential 4 and the transfer gear train 9 are disposed within a transfer axle case 23. The rear differential 15 is operatively connected to the rear propeller shaft 12 and to the rear axles 16, 17 and serves as a differential between the rear wheels 19, 20.

Figure 1:
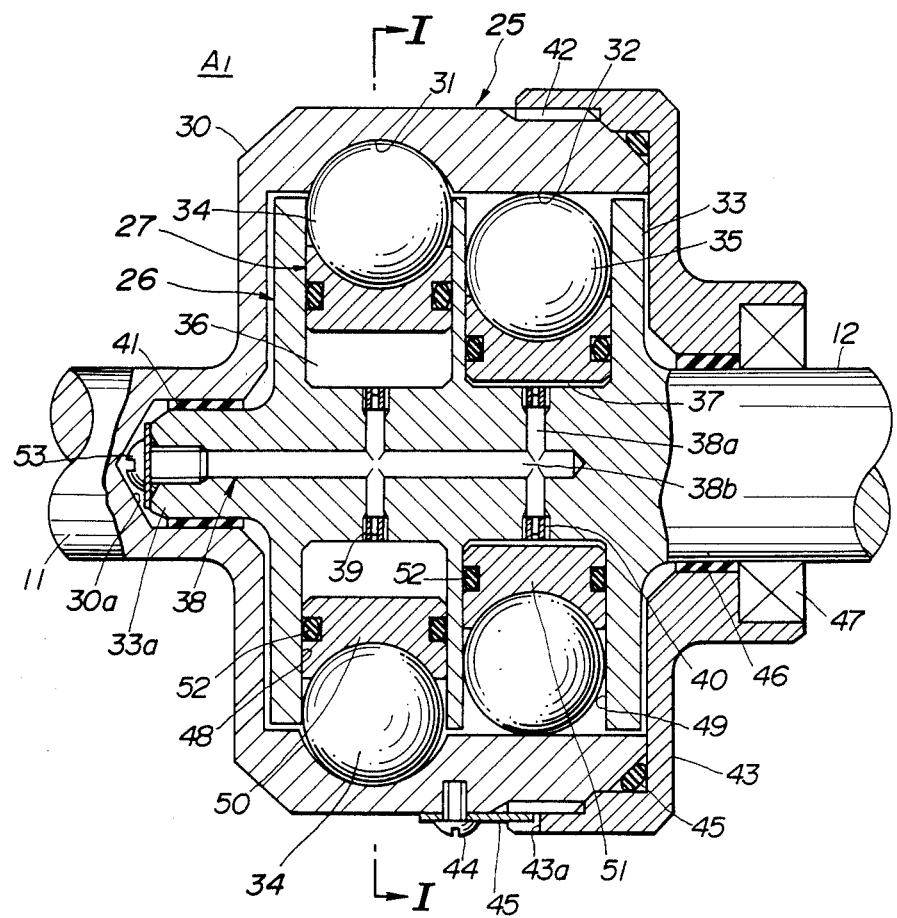
FIG. 1 is an enlarged section through a torque transmitting assembly embodying the present invention.
Figure 2:
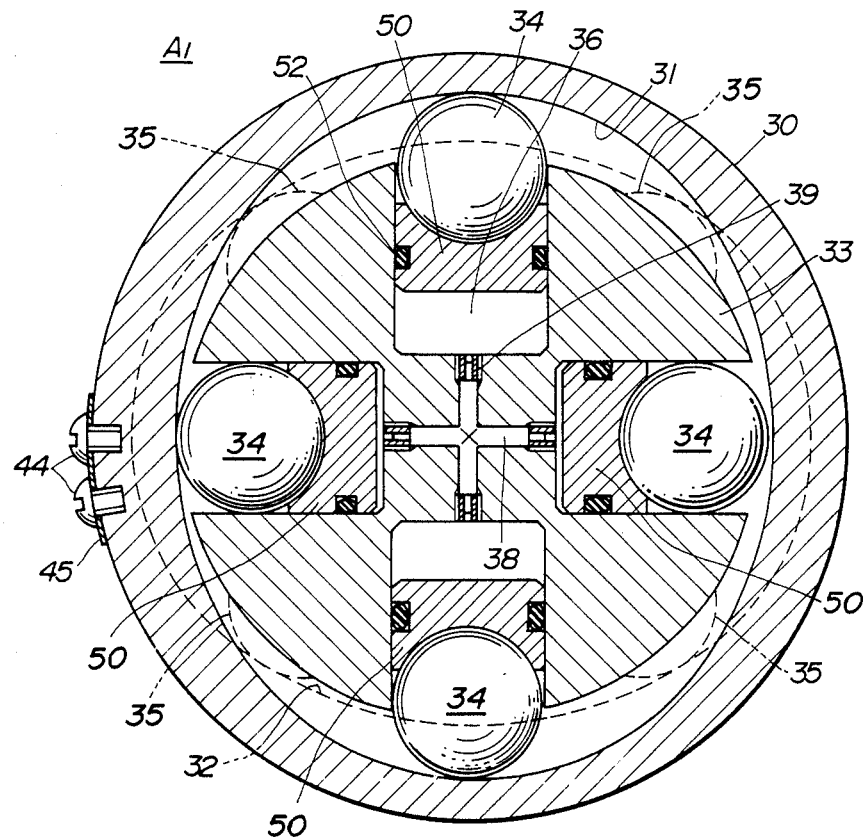
FIG. 2 is a fragmentary section taken on the line I—I of FIG. 1.
Figure 4:
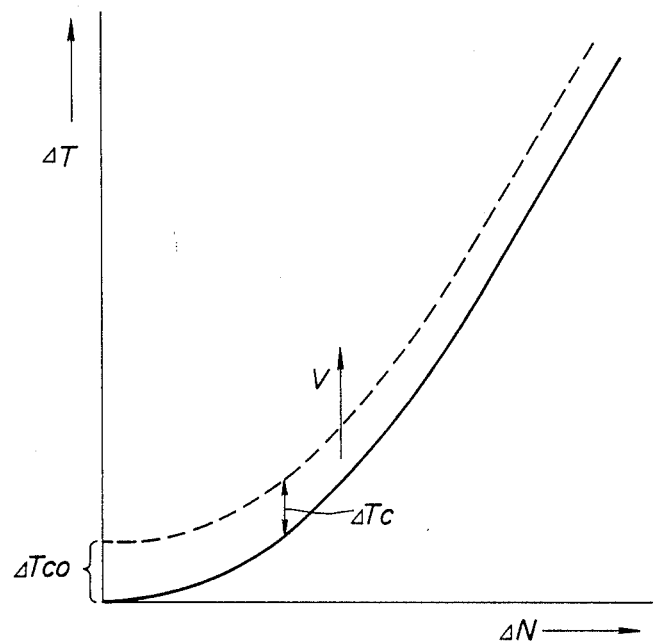
FIG. 4 is a graph showing ΔT versus ΔN characteristic curves with a vehicle speed as a parameter.

Referring now to FIGS. 1, 2 and 4, the details of the first embodiment of the torque transmitting assembly A1 will be described.

The torque transmitting assembly A1 includes a first rotary element 25 which is formed from a cam ring section 30 and an end cover section 43 threadedly secured together at 42. The relative rotation between the cam ring section 30 and the end cover 43 is prevented by a plate 45 having one end portion secured to the outer periphery of the cam ring section 30 by means of screws 44 and an opposite end portion engaged in a cutout 43a formed from axial end of the end plate 43. Interposed between the cam ring 30 and the end cover 43 is an O-ring 45. The first rotary element 25 is integrally formed with the first rotary member 11 in the form of the center propeller shaft which, as previously described, is adapted to provide a drive connection with the differential case 22 which is in driving connection with the engine 1 via the transmission 2. Journalled in the first rotary element 25 by means of bushings 41 and 46 is a second rotary element 26 formed from a rotor section 33 and a centering hub section 33a. Adjacent to the bushing 46 is positioned an oil seal 47 which is press fitted in the end cover 43. The second rotary element 26 is formed integral with a second rotary member 12 in the form of the rear propeller shaft which, as previously described, is adapted to the rear differential 15 connected to the rear axles 16, 17. As can be best seen in FIG. 2, the second rotary element 26 is coaxially disposed within the first rotary element 25. The cam ring section 30 of the first rotary element 25 has a first internal cam surface 31 and a second internal cam surface 32 located radially outwardly of complementary portions of the rotor section 33 of the second rotary element 26. The cam surafces 31 and 32 have elliptic profiles which are angularly displaced 90°. In the rotor section 33 are located a plurality of pressure chambers 36 and 37.

From the foregoing description, it will be recognized that a direct drive is provided between the first rotary member 11 and the first rotary element 30 and from there through the second rotary element 26 to the second rotary member 12 via a hydraulic means 27. This hydraulic means 27 will now be described.

The hydraulic means 27 includes the rise and fall cam surfaces 31 and 32 located, in tandem, the pressure chambers 36, 37, pistons 50, 51 positioned in the chambers 36, 37, respectively, and hydrauluic fluid passage means 38 within the second rotary element 26. The hydraulic fluid passage means 38 includes an axial passage 38b and a plurality of radial passages 38a having one ends communicating with the axial passage 38b and opposite ends communicating with the bottoms of the pressure chambers 36 and 37, respectively. Various flow restrictors 39, 40 in the form of orifices are disposed in the radial passages 38a adjacent to their opposite ends, respectively. One open end of the axial passage 38a, which end is used to receive hydraulic fluid, is closed by a removable nut 53 with a seal. As will be understood from FIG. 2, the pressure chambers 36, 37 are in four sets, and the pistons 50, 51 are similarly in four sets. The pistons 50, 51 receive balls 34, 35 at their radially outer ends to provide maximum contact with the cam surfaces 31, 32 even though the radially outer ends may be countoured to provide maximum contact with the cam surfaces. Since all of the pressure chambers 36, 37 are filled with hydraulic fluid to provide contacts of the balls 34, 35 with the cam surfaces 31, 32, the pistons 50, 51 will reciprocate upon differential rotation occurring between the first rotary element 25 and the second rotary element 26. Thus, when such relative rotation occurs, the pistons will reciprocate to provide a pumping action within the pressure chambers 36, 37. In order to enhance this pumping action, seal rings 52 are received by the pistons 50, 51, respectively. In its normal operating position, a hydraulic fluid fills the passage means 38 of the hydraulic means, i.e., the axial passage 38b and the radial passages 38a.

In its operating condition where there is no relative rotation $\Delta N$ (delta N), the pistons 50, 51 of the torque transmitting assembly A1 will not reciprocate. Since the pistons 50, 51 and their balls 34, 35 are thrown radially outwardly due to centrifugal force as the second rotary element 26 rotates, the balls 34, 35 increase their engagement with the cam surfaces 31, 32 as the speed of rotation of the second rotary element 26 increases. The centrifugal force increases in proportion to the square of the speed v of rotation of the second rotary element 26, so that the transmission of torque from the first rotary member 11 to the second rotary member 12, viz., $\Delta Tco$ (delta Tco), increases in proportion to the square of the speed v of rotation of the second rotary member 12. The transmission of torque $\Delta Tco$ to the second rotary member 12 and then to the rear wheels 19, 20 occurs when the vehicle runs at high speeds.

Thus, the vehicle acts as a two wheel drive vehicle when it runs substantially straight on a dry road at low or intermediate speeds, whereas it acts as a four wheel drive vehicle when it runs substantially straight at high speeds.

In its operating condition where a relative rotation $\Delta N$ (delta N) occurs between the first rotary element 25 and the second rotary element 26, the pistons 50, 51 reciprocate to provide a pumping action. To permit hydraulic fluids to be displaced from two sets of pressure chambers on the discharge strokes of the pistons and to replenish the hydraulic fluid discharged to the other two sets of pressure chambers on the suction strokes of the pistons, all of the pressure chambers are in communication with each other by the passage means 38. When such reciprocation occurs, fluid can be discharged from each pressure chamber on the discharge stroke of the asociated piston through its radial passage 38a at a rate controlled by the associated flow restrictor 40. The transmission of torque from the first rotary element 30 to the second rotary element 26, viz., $\Delta T$ (delta T), is determined by the algebraic sum of forces with which the balls 34, 35 are urged to engage with the cam surfaces 31, 32. Each force is the product of the effective pressure acting area of each piston and the pressure of hydraulic fluid within the associated pressure chamber. The pressure of the hydraulic fluid within each chamber is determined by the pressure drop created across the associated flow restrictor. The pressure drop becomes great as the relative rotation $\Delta N$ (delta N) increases. Thus, the greater the amount of the relative rotation $\Delta N$ (delta N), the greater will be the transmission of torque $\Delta T$ (delta T) that is transmitted to the second rotary member 12 and then to the rear wheels 19, 20. The fully drawn curve shown in FIG. 4 illustrates the characteristic of $\Delta T$ versus $\Delta N$. As described before, the greater the vehicle speed V, the greater will be the transmission of torque $\Delta Tco$. Thus, the actual transmission of torque to the rear wheels 19, 20 is the sum of $\Delta T$ and $\Delta Tco$. The broken line curve shown in FIG. 4 illustrates the characteristic of this actual transmission of torque when the vehicle speed V is fixed at a certain value. Therefore, the extent of transmission of torque to the rear wheels 19, 20 is variable in response to the differential rotation $\Delta N$ and vehicle speed V.

It will now be recognized that, with the vehicle incorporating the torque transmitting assembly A1 as shown in FIG. 3, when the front wheels 7, 8 have lost their traction and are slipping, the vehicle shifts from the two wheel drive state to the four wheel drive state in accordance with the extent to which the front wheels 7, 8 slip. As a result, the start-up performance and the acceleration performance of the vehicle have been enhanced. The travelling performance of the vehicle on passing through an area covered with rain or snow has been enhanced. Besides, even if the front wheels have lost traction when passing through muddy terrain, the torque will be transmitted to the rear wheels 19, 20, so that the ability of the vehicle to pass through such rough terrain has been improved.

It will also be recognized that although a small differential rotation $\Delta N$ occurs when the vehicle turns a corner at a low vehicle speed, since the transmission of torque to the rear wheels 19, 20 is small under this condition, so called tight corner braking phenomena will not take place. Under this operating condition, the torque transmitting assembly A1 absorbs the differential rotation and thus acts as a center differential.

However, when the vehicle turns a corner at a high vehicle speed, a relatively large rotation $\Delta N$ (delta N) occurs, so that the transmission of torque to the rear wheels 19, 20 is large under this condition. Thus, under this condition, the four wheel drive state with relatively large transmission of torque $\Delta T$ (delta T) is accomplished. Since the drive is distributed to the four wheels, the limit vehicle velocity upon turning a corner increases. Thus, the performance of the vehicle upon negotiating a corner improves.

Figure 6:
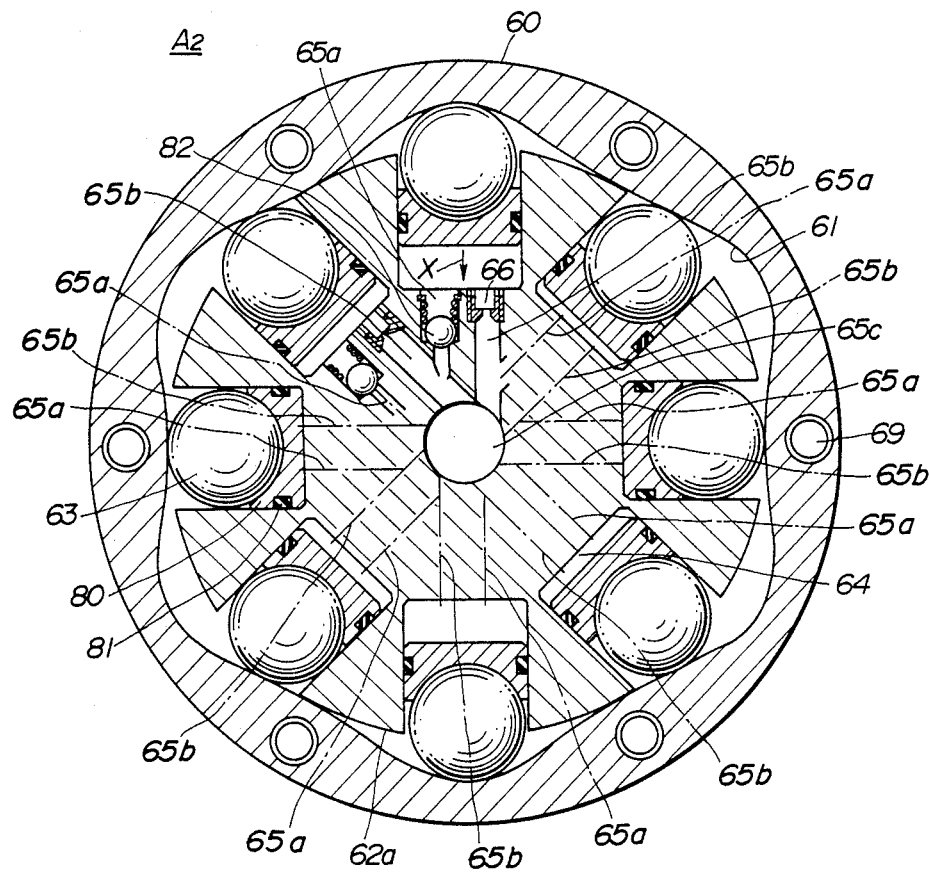
FIG. 6 is a fragmentary section taken on the line II—II of FIG. 5.
Figure 7:
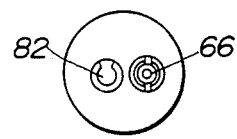
FIG. 7 is a fragmentary view as viewing in the direction of an arrow X of FIG. 6.
Figure 8:
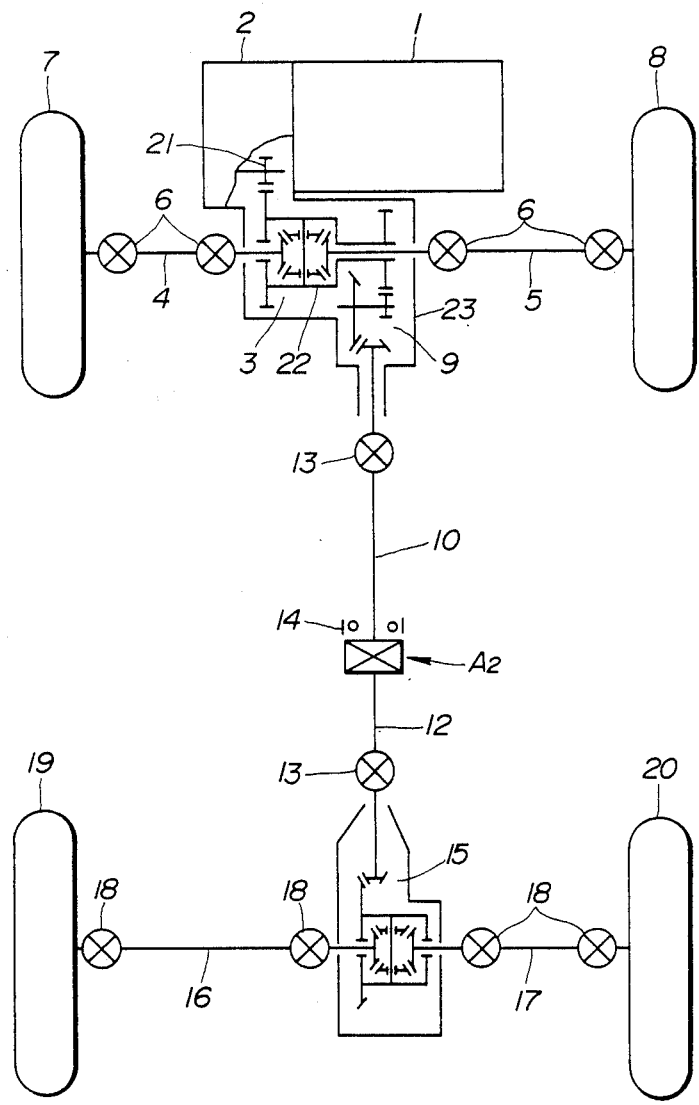
FIG. 8 is a fragmentary schematic top plan view showing a drive assembly of a four wheel drive vehicle containing the embodiment of the present invention shown in FIG. 5.

Referring to FIGS. 5 to 8, a second embodiment of the present invention is described. Attention is now directed to FIG. 8 for a description of a vehicle in which the second embodiment of the present invention is employed such that it serves as a center differential, a transfer/split unit, or a coupling. The vehicle employs the second embodiment of a torque transmitting assembly A2 as being operatively connected between a front propeller shaft 10 and a rear propeller shaft 12. The other portions of the vehicle are quite the same as the counterparts of FIG. 3. Thus, the same reference numerals are assigned to FIGS. 3 and 8 and a further description of FIG. 8 has been omitted.

Figure 5:
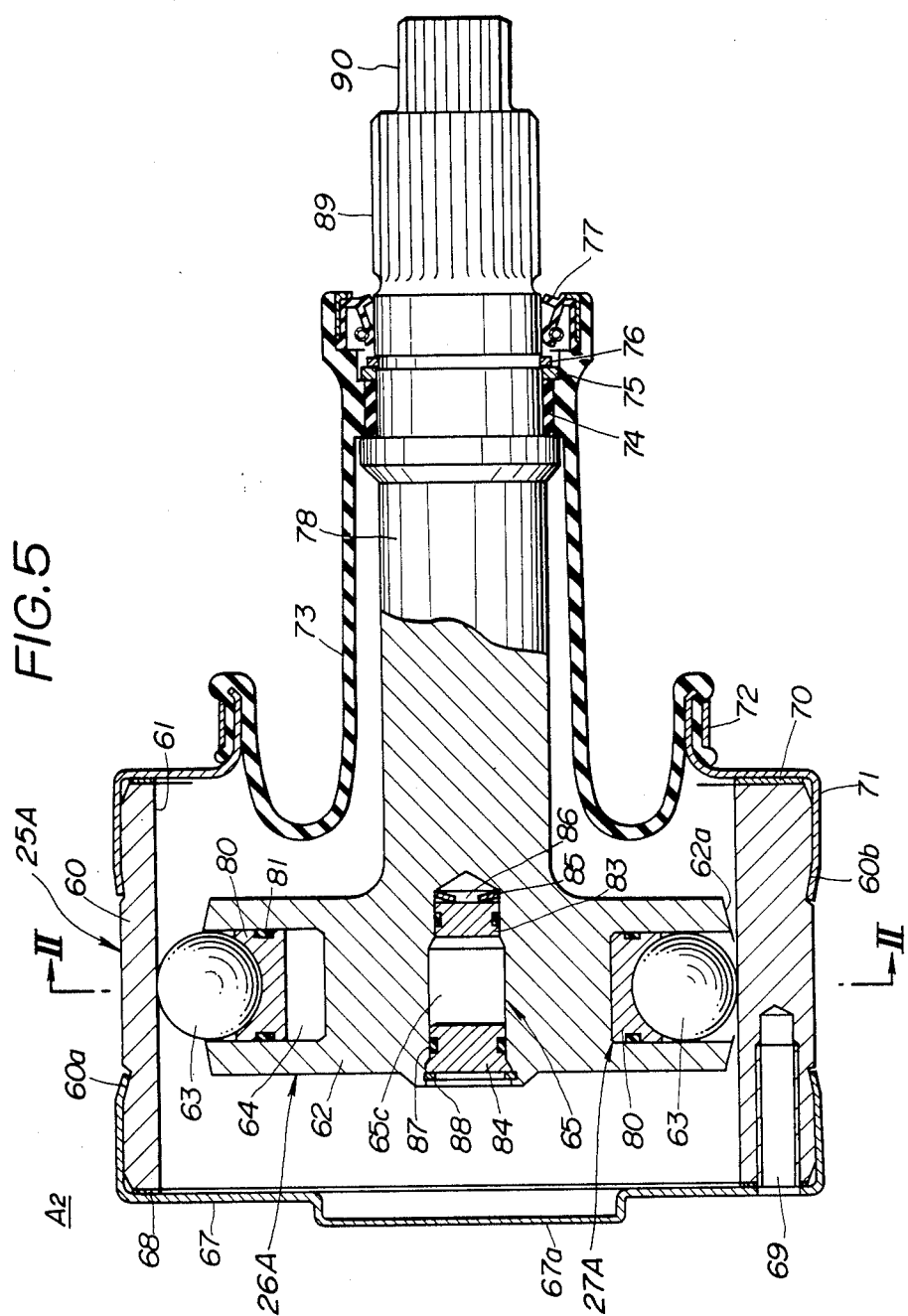
FIG. 5 is an enlarged section through second embodiment of a torque transmitting assembly embodying the present invention.

Referring now to FIGS. 5 to 7, the details of the second embodiment of the torque transmitting assembly A2 will be described.

The torque transmitting assembly A2 includes a first rotary element 25A which is formed from a cam ring section 60, a cover 67, and a boot 73. With the cover 67, the cam ring section 60 is drivingly connected with a first rotary member in the form of the front propeller shaft 10. The cover 67 is secured to the cam ring section 60 with its axial end engaged in a peripheral groove 60a formed around the cam ring section 60. A seal element 68 is interposed between the cover 67 and the cam ring section 60. For the purpose of centering with respect to the front propeller shaft 10 the cover 67 has a circular protuberance 67a. The cover 67 and the cam ring section 60 are formed with a plurality of tapped bolt receiving holes 69. Although it is not illustrated in FIG. 5, the front propeller shaft 10 is secured to the cam ring section 60 by means of a plurality of bolts threadedly engaged in the holes 69. The boot 73 has one end attached to the cam ring section 60 by means of a boot retainer 71 and a band 72. The boot retainer 71 is secured to the cam ring section 60 with its axial end engaged in another peripheral groove 60b formed around the cam ring section 60. Interposed between the boot retainer 71 and the cam ring section 60 is a seal element 70. The boot 73 is fixedly attached to an annular extension of the cover 67 by means of the band 72. Disposed in the first rotary element 25A is a second rotary element 26A which is formed from a rotor section 62 and a shaft section 78 that extends outwardly through the boot 73. For driving connection with a second rotary member in the form of the rear propeller shaft 12, the shaft section 78 includes a splined section 89 and a tapped section 90. In order to allow relative rotation of the shaft section 78 with respect to the boot 73, a bushing 74 is securely bonded to the interior of the boot 73. The bushing 74 is firmly held on the boot 73 by means of a spacer 75 and a snap ring 76. Positioned adjacent to and outwardly of the snap ring 76 is an oil seal 77 which is attached to the boot 73. As best seen in FIG. 6, the cam ring section 60 of the first rotary element 25A has six internal radially directed rise and fall cam surfaces 61 located radially outwardlly of the rotor section 62 of the second rotary element 26A. The cam surfaces 61 form a generally hexagonal profile. In the rotor section 62 are located a plurality of pressure chambers 64.

From the foregoing description, it will be recognized that a direct drive is provided between the first rotary member 10 and the first rotary element 25A and from there through the second rotary element 26A to the second rotary member 12 via a hydraulic means 27A which will now be described.

The hydraulic means 27A includes the radially directed rise and fall cam surfaces 61, pistons 80 positioned in the chambers 64, respecively, and hydraulic fluid passage means 65. The hydraulic fluid passage means 65 includes a cylindrical bore 65c, which serves as an accumulator chamber, radial hydraulic fluid discharge passages 65b which have their radially inward ends communicating with the cylindrical bore 65c and radially outward ends communicating with the respective pressure chambers 64. Each of the hydraulic fluid discharge passages 65b is provided with a flow restrictor in the form of an orifice 66 near its radially outward end thereof. The pistons 80 receive balls 63 at their radially outer ends to provide maximum contacts with the cam surfaces 61. Slidably disposed in the axial bore 65c is an air piston or an accumulator piston 83. The piston 83 defines an air chamber 86 within which is positioned a belleville spring 85 biasing the piston 83. An open end of the axial bore 65c, which end is used to charge the second rotary member 26A with hydraulic fluid, is closed by a removable plug 84 and a snap ring 88. By virtue of this arrangement, when reciprocation of the pistons 80 occurs, hydraulic fluid can be discharged from each pressure chamber 64 through its radial discharge passage 65b to the accumulator chamber 65c. The extent to which the hydraulic fluid can be discharged from each pressure chamber on the discharge stroke of the associated piston is controlled by the associated flow restrictor 66. For the present apparatus to remain operational, it is necessary that the hydraulic fluids that are discharged from the pressure chambers on the discharge strokes of the pistons be replenished on the suction strokes of the pistons. This is accomplished by suction passages 65a, each having one end communicating with one pressure chamber and an opposite end communicating with the accumulator chamber 65c via the discharge passage extending from the adjacent pressure chamber 64. Provided for each suction passage 65a is a one-way ball check element 82 that is arranged to prevent hydraulic fluid from the pressure chamber therethrough although it allows the admission of hydraulic fluid into the pressure chamber. When a pressure drop occurs in the pressure chamber by virture of movement of the piston 80 during its suction stroke, hydraulic fluid within the accumulator chamber 65c will flow to the pressure chamber through the suction passage 65a past the one-way ball check element 82. In order to enhance the pumping effect by the pistons 80, seal rings 81 are received by the pistons 80, respectively.

The operation of this second embodiment is substantially the same as the first embodiment. However, the accumulator chamber 65c which is variable in volume is provided in the passage means 65. By virtue of this arrangement, thermal expansion of hydraulic fluid can be compensated for. As indicated before, the open end of the axial bore 65c serves as an inlet port and this inlet port is used to charge the second rotary element 26A with hydraulic fluid. The hydraulic fluid is charged to the extent that the air piston 83 compresses air within the air chamber 86 and flexes the belleville spring 85. By virtue of this arrangement, the second rotary element 26A can be assembled into the first rotary element 25A with less difficulty in centering. When the axis of rotation of the second rotary element 26A forms an angle with respect to the axis of rotation of the first rotary element 25A, some of the pistons 80 must move radially outwardly to maintain maximum contacts with the cam surfaces 61, causing volume expansions of the pressure chambers. In order to compensate for this volume expansion, the air pressure within the air chamber 86 and the bias force of the belleville spring 85 urges the air piston 83 to decrease the volume of the accumulator chamber to displace hydraulic fluid from the accumulator chamber 65c toward the pressure chambers on the volume expansion phase. When, during transmission of torque, a large torque is applied to the first rotary element 25A, some of the balls 63 of the pistons 80 are biased radially inwardly. Under this condition the balls 63 and the associated pistons 80 can retract to the extent that belleville spring 85 is flattened. Thus, the illustrated arrangement can damp impact which otherwise would be transmitted to the drive system. It will also be recognized that the air piston 83 can adjust the volume of the accumulator chamber 65c so as to compensate for a variation in volume among the pressure chambers created due to tolerance of the constituent parts. Besides, the illustrated arrangement can effect adjustment needed due to development of wear or abrasion of the movable parts.

Figure 9:
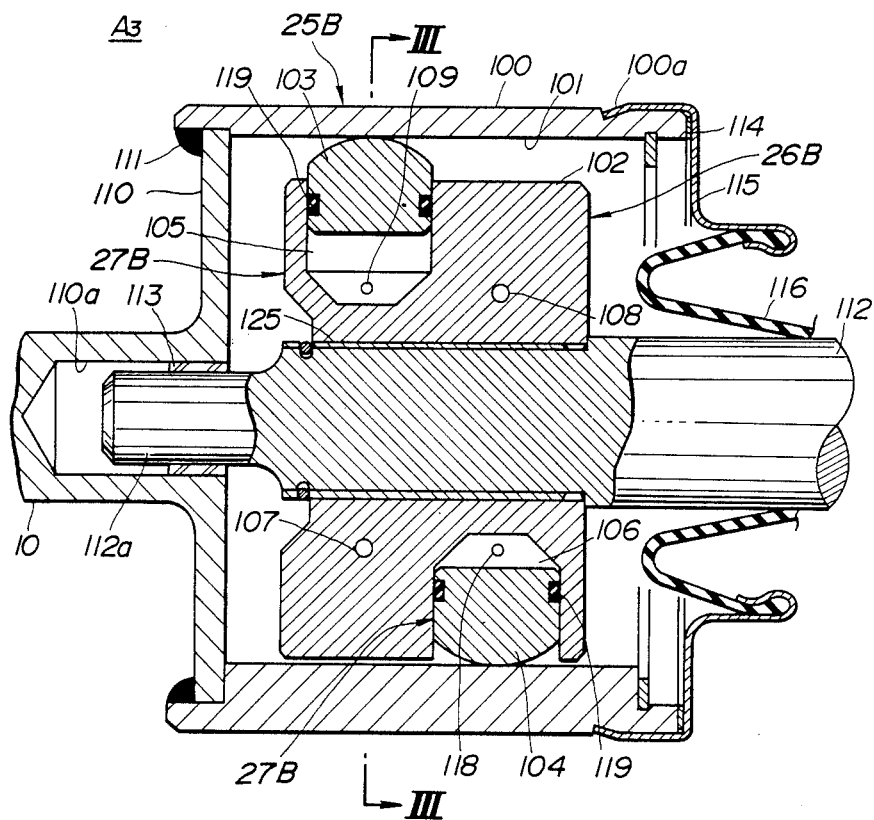
FIG. 9 is an enlarged section through a third embodiment of a torque transmitting assembly of the present invention.
Figure 10:
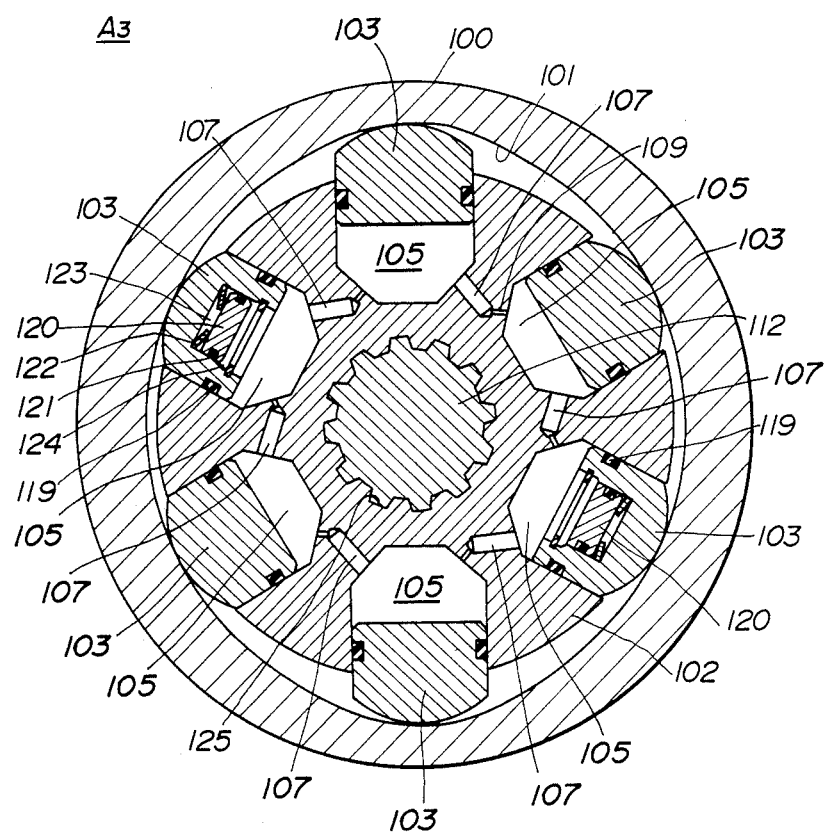
FIG. 10 is a fragmentary section taken on the line III—III of FIG. 9.

Referring to FIGS. 9 and 10, a third embodiment of the present invention is described. Similarly to the second embodiment A2 as shown in FIG. 8, the third embodiment of a torque transmitting assembly A3 is operatively connected between a front propeller shaft 10 and a rear propeller shaft 12. The details of the third embodiment of the torque transmitting assembly A3 will be described.

The torque transmitting assembly A3 includes a first rotary element 25B which is formed from a cam ring section 100, an end plate 110, and a boot 116. The end plate 110 is secured to the cam ring section 100 by welding at 111. The end plate 110 is formed integral with a first rotary member in the form of the front propeller shaft 10. The boot 116 has one end attached to the cam ring section 100 by means of a boot retainer 115. The boot retainer 115 is secured to the cam ring section 100 with its axial end engaged in a peripheral groove 100a formed around the cam ring section 100. Interposed between the cam ring section 100 and the boot retainer 115 is a seal element 114. Disposed in the first rotary element 100 is a second rotary element 26B which is formed from a rotor section 102 and a shaft section 112 that extends outwardly of the boot 116. The shaft section 112 is drivingly connected to a second rotary member in the form of the rear propeller shaft 12. The shaft section 112 is splined to the rotor section 102 as illustrated, and it has a reduced diameter spindle 112a at its inward end. The spindle 112a is rotatably received by a pilot bushing 113 in a pilot bore 110a formed in a central proturberance of the end plate 110 for centering the shaft section 112 with respect to the front propeller shaft 10. As best seen in FIG. 10, the cam ring section 100 of the first rotary element 25B has two internal radially directed rise and fall cam surfaces 101 located radially outwardly of the rotor section 102 of the second rotary element 26B. The cam surfaces 101 form a generally elliptic profile. In the rotor section 102 are located six first pressure chambers 105 and another six second pressure chambers 106.

From the foregoing description, it will be recognized that a direct drive is provided between the first rotary member 10 and the first rotary element 25B and from there through the second rotary element 25B to the second rotary member in the form of the rear propeller shaft 12 (see FIG. 8) via a hydraulic means 27B which will now be described.

The hydraulic means 27B includes the cam surfaces 101, first pistons 103 positioned in the first chambers 105, second pistons 104 positioned in the second pressure chambers 106, and hydraulic fluid passage means 107, 108. The hydraulic fluid passage means includes six passages 107, each having one end communicating with one pressure chamber 105 and an opposite end communicating with the adjacent pressure chamber 105 via a flow restrictor in the form of an orifice 109, and six passages 108 each having one end communicating with one pressure chamber 106 and an opposite end communicating with the adjacent pressure chamber 106 via a flow restrictor in the form of an orifice 118. The pistons 103, 104 have radially outer ends countoured to provide maximum contacts with the cam surfaces 101. Seal rings 119 are received by the pistons 103 and 104, respectively, in order to enhance pumping action by the pistons. In order to absorb thermal expansion of hydraulic fluid in the closed fluid circuit involving the pressure chambers 105, the hydraulic means 27B includes air pistons 120 slidably received in radially inwardly opening bores of two pistons 103. Each air piston 120 which carries an O-ring 121 defines an air chamber 123 and it is biased by a belleville spring 122 positioned in the air chamber 123 against a snap ring 124 fixed to the associated piston 103. Similarly, air pistons are received in two pistons 104 in order to compensate for thermal expansion of hydraulic fluid in the closed fluid circuit involving the pressure chambers 106.

The operation of this embodiment is substantially the same as that of the second embodiment except that, in the transmitting assembly A3, no articulation is permitted.

Figure 12:
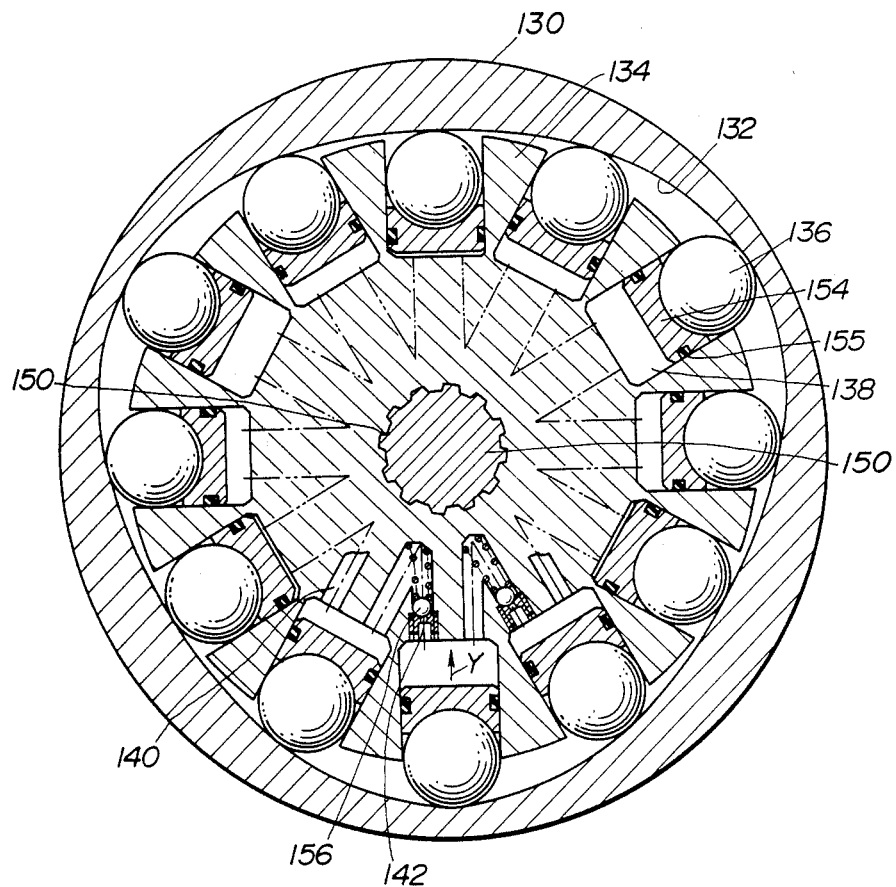
FIG. 12 is a fragmentary section taken on the line IV—IV of FIG. 11.
Figure 13:
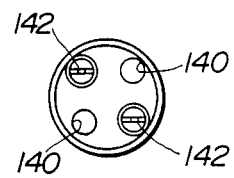
FIG. 13 is a fragmentary view as viewed along an arrow Y of FIG. 12.
Figure 14:
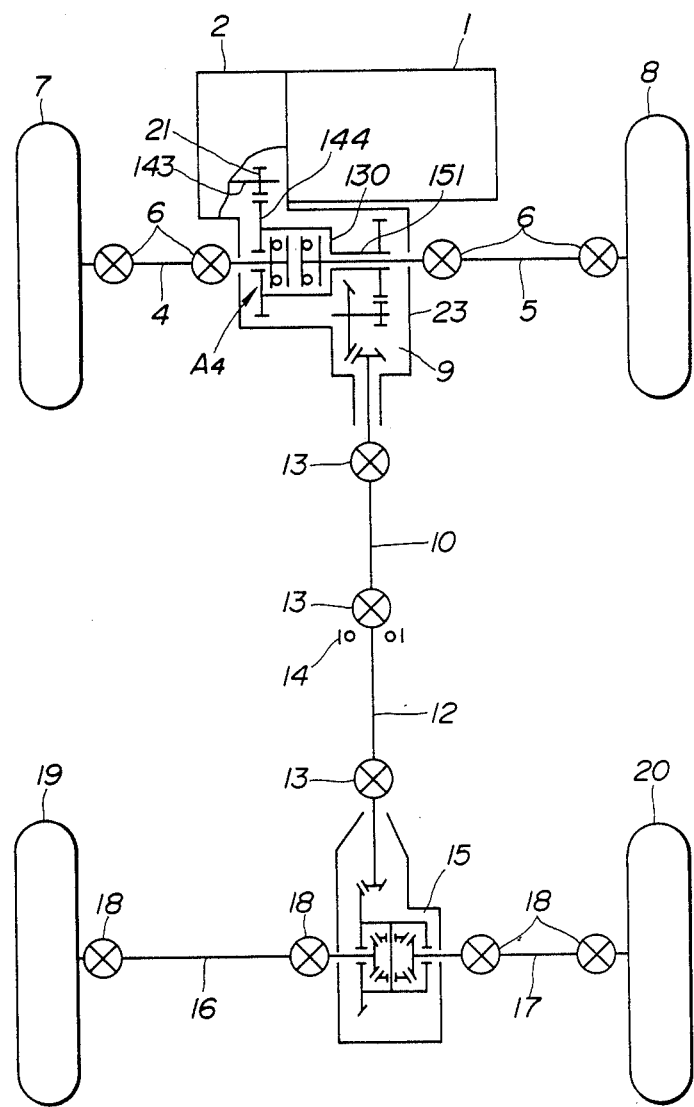
FIG. 14 is a fragmentary schematic top plan view showing a drive assembly of a four wheel drive vehicle containing the embodiment of the present invention shown in FIG. 11.

Referring to FIGS. 11 to 14, a fourth embodiment of the present invention is described. Attention is now directed to FIG. 14 for a description of a vehicle in which the fourth embodiment of the present invention is employed. The vehicle is of a four wheel drive vehicle employing a front engine rear drive. The vehicle includes an engine 1, a transmission 2, a front torque transmitting (or differential) assembly A4, front axles 4, 5, front drive joints 6, front wheels 7, 8, a transfer gear train 9, a front propeller shaft 10, a rear propeller shaft 12, propeller shaft joints 13, a center bearing 14, a rear differential 15, rear axles 16, 17, rear drive joints 18, and rear axles 19, 20.

The torque transmitting assembly A4 is drivingly connected to a final stage gear 21 of the transmission carried by a final gear shaft 143 and to the front axles 4, 5.

Figure 11:
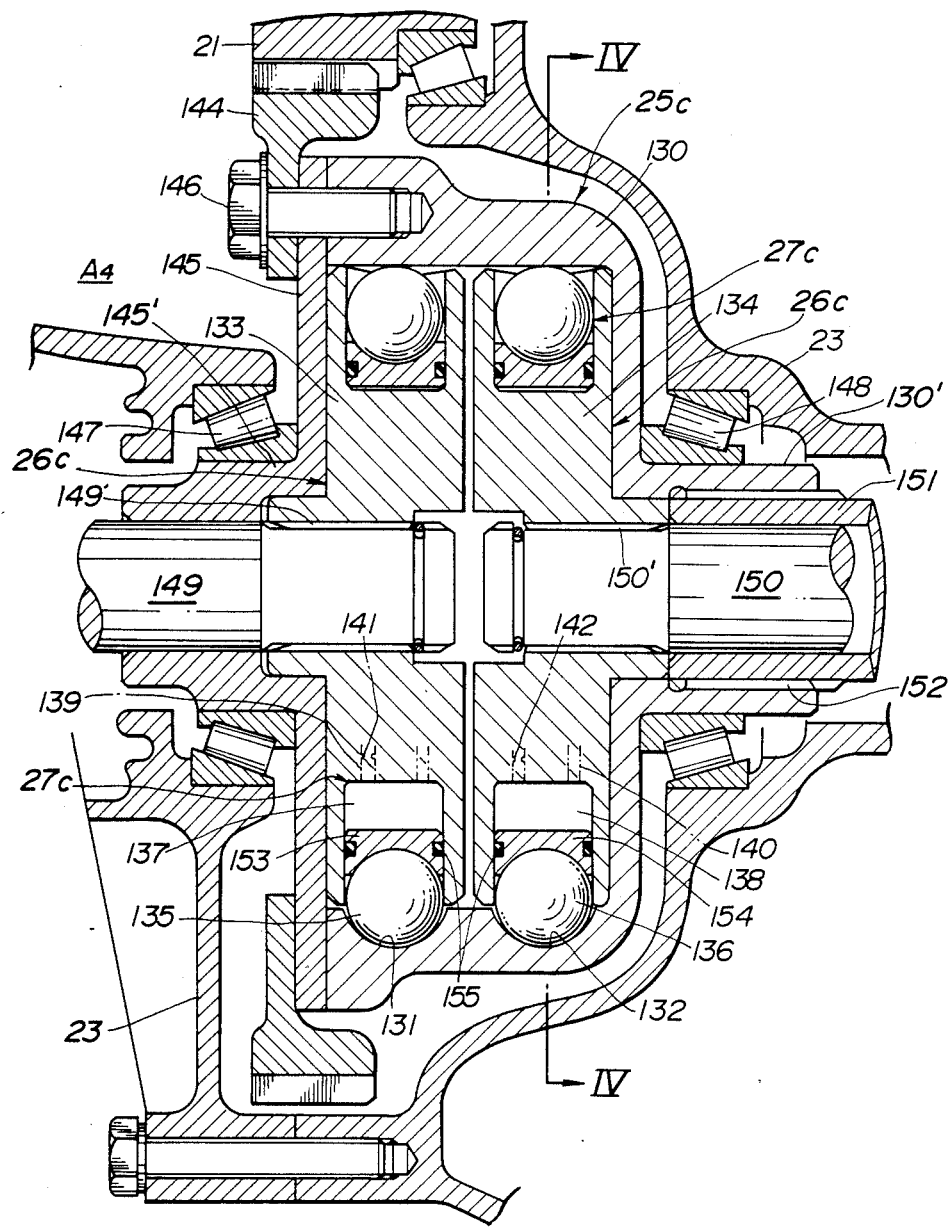
FIG. 11 is an enlarged section through a fourth embodiment of a torque transmitting assembly of the present invention.

Referring now to FIGS. 11 to 13, the details of the fourth embodiment of the torque transmitting assembly A4 will be described.

The torque transmitting assembly A4 includes a first rotary element 25C which is formed from a cam ring section 130 having one end extending radially inwardly and terminating into a sleeve 130', a cover 145 including a sleeve 145' with a radial extension secured to the opposite open end of the cam ring section 130. The cover 145 is secured to the cam ring section 130 by means of bolts 146 via which a a first rotary member in the form of a ring gear 144 is securely attached to the first rotary element 25C. The first rotary element 25C is journalled within a transaxle housing 23 via two roller bearings 147 and 148 which rotatably support the sleeve 145' and the sleeve 130', respectively. The sleeve 130' is splined at 152 to a hollow shaft 151 drivingly connected to the front propeller shaft 10 via the transfer gear train 9. The ring gear 144 is in mesh with the final stage gear 21. Disposed in the first rotary element 25C is a second rotary element 26c which is formed from a pair of rotor sections 133, 134, and a pair of shaft sections 149, 150 that extend in the opposite directions outwardly of the transaxle case 23. The shaft section 149 is splined to the rotor section 133 at 149', while the shaft section 150 is splined to the rotor section 134 at 150'. The shaft sections 149 and 150 are drivingly connected to a pair of second rotary members in the form of front axles 4 and 5 via the front shaft joints 6 (see FIG. 14). The cam ring section 130 of the first rotary element 25C has three internal radially directed rise and fall cam surfaces 131 and another three internal radially directed rise and fall cam surfaces 132. In the rotor section are located twelve pressure chambers 137 radially inwardly of the cam surfaces 131, while in the rotor section 134 are located another twelve pressure chambers 138 radially inwardly of the cam surfaces 132. As best seen in FIG. 12, the cam surfaces 132 form a generally triangular profile. The cam surfaces 131 are the same as the cam surfaces 132 and form a generally triangular profile.

From the foregoing description, it will be recognized that direct drive is provided between the first rotary member 144 and the first rotary element 25C and from there through the second rotary element 26C to the second rotary members in the form of the front axles 4, 5 (see FIG. 14) via a hydraulic means 27C which will now be described.

The hydraulic means 27C includes the cam surfaces 131, the cam surfaces 132, pistons 153 positioned in the pressure chambers 137, pistons 154 positioned in the pressure chambers 138, and hydraulic fluid passage means 139, 140. As will be readily understood from FIGS. 12 and 13, the hydraulic passage means includes twelve pairs of passage 140, each pair having one ends communicating with one pressure chamber 138 and opposite ends communicating with the adjacent pressure chamber 138. Among each pair of passages 140, one passage 140 has one end communicating with one pressure chamber 138 and the opposite end communicating with the adjacent chamber 138 via a flow restrictor in the form of an orifice 142, while the other passage 140 has one end communicating with the one pressure chamber 138 via a flow restrictor in the form of an orifice 142 and the opposite end communicating with the adjacent pressure chamber 138. A spring biased ball check element 156 is disposed in the one passage 140 in such a manner as to close the orifice 142 and prevent flow of fluid through the one passage into the adjacent pressure chamber 138. A spring biased ball check element 156 is disposed in the other passage 140 in such a manner as to close the orifice 142 and prevent flow of fluid through the other passage into the one pressure chamber 138. Although not illustrated, the hydraulic passage means also include twelve pairs of passages 139, each pair having one ends communicating with one pressure chamber 137 and opposite ends communicating with the adjacent pressure chamber 137. Among each pair of passages 139, one passage 139 has one end communicating with one pressure chamber 137 and the opposite end communicating with the adjacent chamber 137 via a flow restrictor in the form of an orifice 141, while the other passage 139 has one end communicating with the one pressure chamber 137 via a flow restrictor in the form of an orifice 141 and the opposite end communicating with the adjacent pressure chamber 137. A spring biased ball check element, not illustrated, is disposed in the one passage 139 in such a manner as to close the orifice 141 and prevent flow of fluid through the one passage into the adjacent pressure chamber 137. A spring biased ball check element, not illustrated, is disposed in the other passage 137 in such a manner as to close the orifice 141 and prevent flow of fluid through the other passage into the one pressure chamber 137. The pistons 153 receive balls 135 at their radially outer ends to provide maximum contact with the cam surfaces 131, and similarly the pistons 154 receive balls 136 at their radially outer ends to provide maximum contact with the cam surfaces 132. Since all of the pressure chambers 137, 138 and hydraulic passage means 139, 140 are filled with hydraulic fluid to provide contacts of the balls 135, 136 with the cam surfaces 131, 132, the pistons 153, 154 will reciprocate upon rotation of the first rotary element 25C relative to the second rotary element 26C. Thus, when such relative rotation occurs, the pistons 153, 154 will reciprocate to provide a pumping action. In order to enhance this pumping action, seal rings 155 are received by the pistons 153, 154, respectively hydraulic fluid passage means includes twelve V-like passages.

Referring to FIG. 14, the drive from the engine 1 is transmitted through the final stage gear 21, the ring gear 144, the cam ring section 130, the hollow shaft 151, the transfer gear train 9, the front propeller shaft 10, the rear propeller shaft 12, the rear axle assembly 15, 16, 17 to the rear wheels 19, 20. When the front wheels 7, 8 do not slip and there is no relative rotation of the first rotary element 25C with respect to the second rotary element 26C, no transmission of torque from the first rotary element 25C to the second rotary element 26C for the same reason previuously described in connection with the first embodiment A1. When the front wheels 7, 8 slip and relative rotation occurs between the first rotary element 25C and the second rotary element 26C, the torque from the first rotary element 25C is transmitted to the second rotary element 26C and then to the front wheels 7, 8. When a relative rotation occurs between the front wheels 7, 8 upon normal turning of the vehicle, this differential rotation can be absorbed even though small transmission of torque is available.

Figure 17:
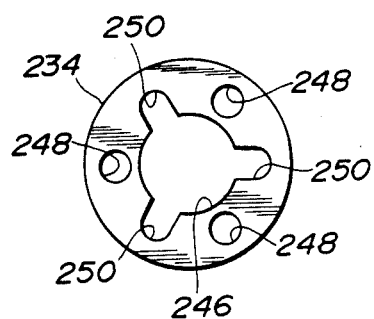
FIG. 17 is a plan view of a flow restrictor plate used in the fifth embodiment.

Referring to FIGS 15 to 17, a fifth embodiment of a torque transmitting assembly A5 according to the present invention is described.

The torque transmitting assembly A5 includes a first rotary element 25D which is formed from a cam ring section 200, and an end plate section 202. The end plate section 202 closes one end of the cam ring section 200 and formed integral with same. The end plate section 202 is formed with a plurality of bolt receiving holes, only one being shown at 204, and a pilot bore 206. The bolt receiving holes 204 and a pilot bore 206 are used to drivingly connect the first rotary element via such as a companion flange to a first rotary member, not illustrated. The end plate 202 is formed with a plurality of cavities 208 opening inwardly, which are used as a fluid reservoir as will be described later. Disposed in the first rotary element 25D is a second rotary element 26D which is formed from a rotor 210. The second rotary element 26D is adapted to be drivingly connected to a second rotary member, not illustrated. As best seen in FIG. 15, the cam ring section 200 of the first rotary element 25D has four internal radially directed rise and fall cam surfaces 212 located radially outwardly of the rotor 210 of the second rotary element 26D. The cam surfaces 212 form a generally rectangular profile. In the rotor 210 are located six pressure chambers 214.

As will be recognized from the foregoing description, a drive is provided from the first rotary element 25D to the second rotary elememt 26D via a hydraulic means 27D which will now be described.

The hydraulic means 27D includes the cam surfaces 212, six pistons 216 positioned in pressure chambers 214, and hydraulic fluid passage means 218. The hydraulic fluid passage means 218 includes an accumulator 220. The accumulator 220 is fixedly secured to the rotor 210 for rotation therewith and includes an accumulator piston 222, and a spring assembly 224 biasing the accumulator piston 222. As best seen in FIG. 16, the accumulator piston 222 cooperates with a retainer 226 to define a variable volume accumulator chamber 228. The volume of the accumulator chamber 222 is determined by the accumulator piston 222 that is movable between a spring set position as illustrated by its upper half in FIG. 16 and another position as illustrated by its lower half in FIG. 16. The retainer 226 is disposed in the accumulator chamber 228 and securely attached to a radially extending wall 230 of the rotor 210 by means of three bolts, only one being shown at 232, with an orifice defining flow restrictor plate 234 as best seen in FIG. 17 interposed therebetween. The retainer 226 includes a central axial through bore 236 aligned with an axial bore 238 of the rotor 210. The retainer 226 includes a hub section 240 defining therearound an axial space 242 which opens the central axial bore 236 via a plurality of radial ports 244. Referring to FIG. 17, the flow restrictor plate 234 has a central bore 246 for receiving the hub section 240 of the retainer 226, three equiangular spaced bolt receiving holes 248 for the bolts 232, and three equiangular, spaced radially extending apertures 250 opening to the central bore 246. The flow restrictor plate 234 serves as a seal plate and seals between the flow restrictor plate 234 and the radially extending wall 230 of the rotor 210. Extending inwardly of the rotor 210 from the radially extending wall 230 are three axial blind bores 252, only two being illustrated in FIG. 15, while only one being shown in FIG. 16. Within the radially extending wall 230, open ends of the blind bores 252 are aligned with the radial apertures 250 of the flow restrictor plate 234, respectively. Each of the axial blind bores 252 communicates with one pressure chamber 214 via a connecting passage 254 and with the diametrically opposed pressure chamber 214 via another cvonnecting passage 256. From the foregoing description, it will be recognized that hydraulic fluids discharged from the pressure chamber on the discharged strokes of the pistons pass through the associated connecting passages 254, 256, the blind bore 252, the radial aperture 250, the annular space 242 formed around the hub section 240, the radial ports 244, the central axial bore 236 of the retainer 226 toward the accumulator chamber 228. It will now be understood that the radially extending apertures 250 provide flow restrictions to flows of hydraulic fluid discharged from the pressure chamber on the discharge strokes of the pistons 216. By virtue of this arrangement, when reciprocation of the pistons 216 occurs, hydraulic fluid can be discharged from the pressure chambers 214 on the discharge strokes of the associated pistons 216 to the accumulator chamber 228 under the flow restriction provided by the flow restrictor plate 234. The degree of flow restriction can be varied by changing the thickness of the flow restrictor plate 234. Thus, any desired degree of flow restriction can be obtained only by replacing the flow restrictor plate 234 without any modification on the other component parts. For the present apparatus to remain operational, it is necessary that the hydraulic fluid from the accumulator chamber 228 be supplied to the pressure chambers 214 on the suction strokes of the associated pistons 216. This is accomplished by six radial inlet bores 258 provided with one-way ball check elements 260, respectively. The radial inlet bores having their inward ends opening to the axial bore 238 and their outward ends opening to the associated pressure chambers 214, respectively. When a pressure drop occurs in the pressure chamber 214 by virture of movement of the piston 216 during its suction stroke, hydraulic fluid within the accumulator chamber 228 will flow through the central axial bore 236 of the retainer 226, the axial bore 238 and the associated radial inlet bore 258 past the associated one-way ball check element 260. In order to prevent excessive rise of pressure in the hydraulic fluid within the accumulator chamber 228, a pressure relief ball check element 262 is provided which is arranged to close a pressure relief port 264 opening to the axial bore 238. Hydraulic fluid discharged from the pressure relief bell check element 262 can flow radially outwardly through passages formed between the end plate section 202 and the rotor 210 toward the cavities 208. The hydraulic fluid contained in the cavities 208 can return to the hydraulic fluid circuit described above even though the detail description is hereby omitted.

The operation of the torque transmitting assembly A5 is substantially the same as that of the torque transmitting assembly A2 described in connection with FIGS. 5–7.

What is claimed is:

1. A torque transmitting assembly, comprising:
   a first rotary element including internal cam surface means;
   a second rotary element disposed in said first rotary element, said second rotary element including a rotor containing a plurality of radially outwardly opening bores facing said cam surface means; and
   hydraulic means for transmitting a ratio of the input torque from said first rotary element and said second rotary element to the other in response to the rotation speed of said second rotary element and also to the differential rotation occurring between said first rotary element and said second rotary element;
   said hydraulic means including:
   pistons in said radially outwardly opening bores in engagement with said cam surface means and reciprocable in response to said differential rotation, each of said pistons carrying a seal in slidable contact with one of said radially outwardly opening bores to define therein a pressure chamber;
   passage means, in fluid communication with said pressure chambers defined in said radially outwardly opening bores, through which hydraulic fluid is discharged from each of said pressure chambers on the discharge stroke of the associated one of said pistons; and
   means disposed in said passage means for restricting flow of the hydraulic fluid discharged from said pressure chambers.

2. A torque transmitting assembly as claimed in claim 1, wherein said hydraulic means includes an accumulator having a variable volume accumulator chamber forming a part of said passage means and disposed downstream of said flow restricting means with respect to the flow of hydraulic fluid discharged from each of said bores.

3. A torque transmitting assembly as claimed in claim 2, wherein said hydraulic means is rotatable with said second rotary element.

4. A torque transmitting assembly as claimed in claim 3, wherein said passage means includes a hydraulic fluid discharge circuit and a hydraulic fluid suction circuit.

5. A torque transmitting assembly as claimed in claim 4, wherein said hydraulic fluid suction circuit includes a one-way check element means associated with each of said pressure chambers for allowing hydraulic fluid to enter the pressure chamber on the suction stroke of the associated piston.

6. A torque transmitting assembly as claimed in claim 5, wherein said hydraulic means includes a pressure relief check element means for preventing the hydraulic fluid pressure within said accumulator chamber from rising above a predetermined level.

7. A torque transmitting assembly as claimed in claim 3, wherein said cam surface means includes a plurality of radially directed rise and fall cam surfaces which are shaped so that when said differential rotation occurs, one set of said pistons reciprocate out of phase with another set of said pistons.

8. A torque transmitting assembly as claimed in claim 3, wherein each of said pistons includes a ball in rolling contact with said cam surface means.

9. A torque transmitting assembly as claimed in claim 1, further comprising a first rotary member in driving connection with said first rotary element, and a second rotary member in driving connection with said second rotary element.

10. A torque transmitting assembly as claimed in claim 9, wherein said second rotary element includes a shaft section coaxially supported by said first rotary element.

11. A torque transmitting assembly as claimed in claim 3, wherein said second rotary element is disposed in said first rotary element for a limited axial movement and articulation.

12. A torque transmitting assembly as claimed in claim 3, wherein said accumulator is formed within at least one of said pressure pistons.

13. A torque transmitting assembly as claimed in claim 12, wherein said passge means includes a plurality of passages, each having one end communicating with one of said pressure chambers and an opposite end communicating wth the adjacent one of said pressure chambers, and said flow restricting means includes a plurality of flow restrictors, each being provided in the passages near the opposite end thereof.

14. A torque transmitting assembly as claimed in claim 1, wherein said second rotary element further includes a second rotor formed with a plurality of radially outwardly opening pressure chambers, and said hydraulic means further includes pistons in said pressure chambers of said second rotor, passage means in fluid communication with said pressure chambers of said second rotor, and means for restricting flow of hydraulic fluid discharged from said pressure chambers of said second rotor.

15. A torque transmitting assembly as claimed in claim 14, wherein each of said passage means includes a plurality of generally V-like passages, each having one end communicating with one of said pressure chambers and an opposite end communicating with the adjacent one of said pressure chambers, and said flow restrictor means includes a plurality of flow restrctors disposed in each of said V-like passages near one end thereof, and each of said passage means further include one-way ball check element disposed in each of said V-like passages to close the associated flow restrictor.

* * * * *